April 22, 1930.  J. H. SHERTS ET AL  1,755,274
METHOD FOR REMOVING DEFECTS OF JOINDER FROM COMPOSITE GLASS PLATES
Filed July 7, 1928  2 Sheets-Sheet 1
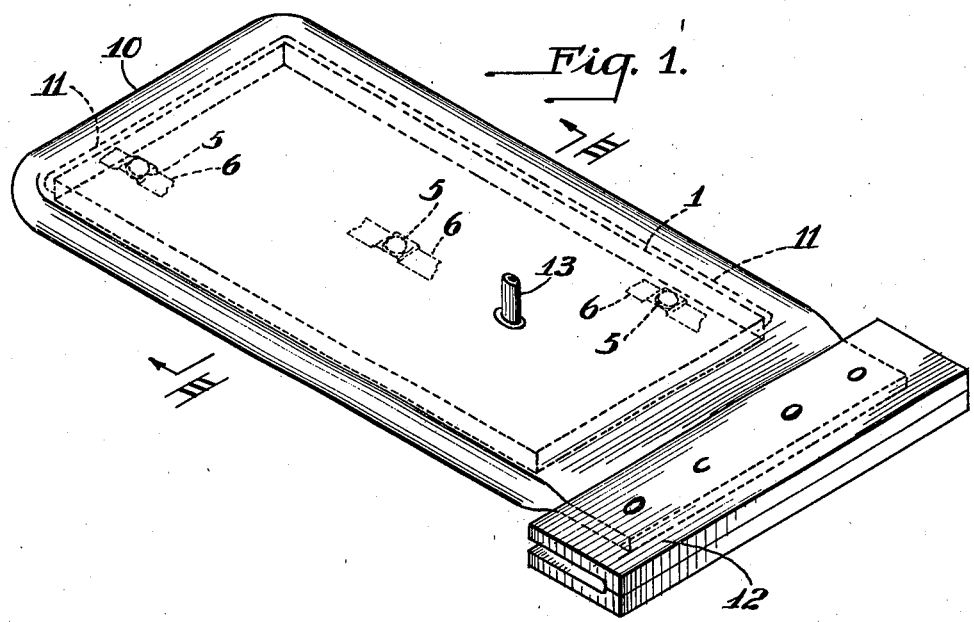
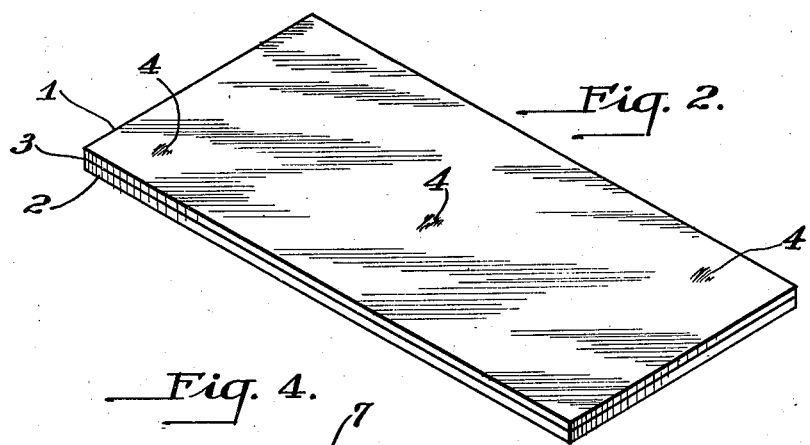
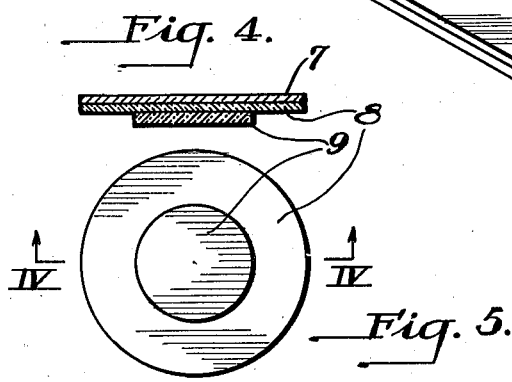
INVENTORS April 22, 1930. J. H. SHERTS ET AL 1,755,274
METHOD FOR REMOVING DEFECTS OF JOINDER FROM COMPOSITE GLASS PLATES
Filed July 7, 1928   2 Sheets-Sheet 2
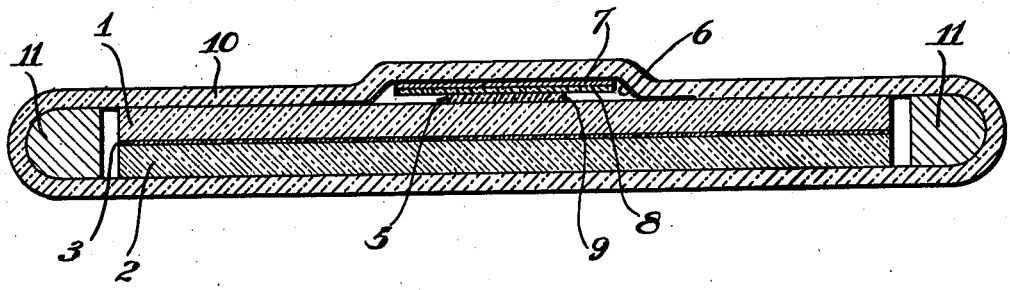
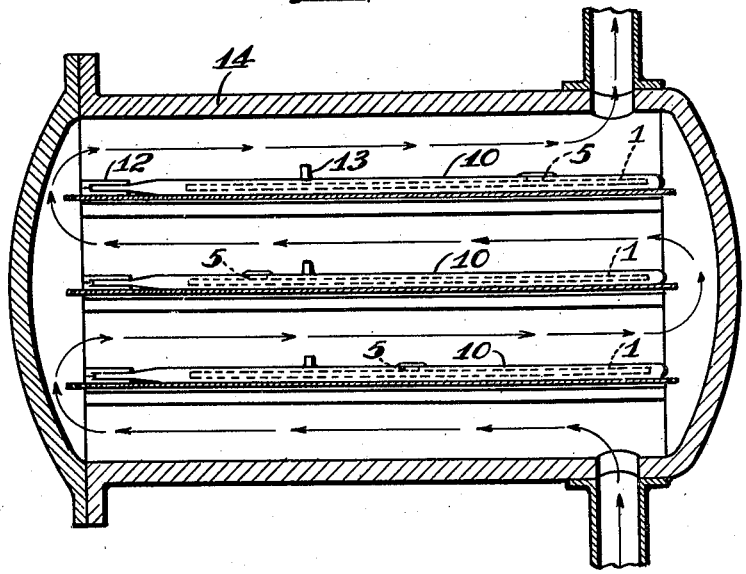
INVENTORS

Patented Apr. 22, 1930

1,755,274

UNITED STATES PATENT OFFICE

JAMES H. SHERTS, OF GLEN RIDGE, NEW JERSEY, AND WILLIAM O. LYTLE, OF NEW KENSINGTON, PENNSYLVANIA, ASSIGNORS TO DUPLATE CORPORATION, A CORPORATION OF DELAWARE

METHOD FOR REMOVING DEFECTS OF JOINDER FROM COMPOSITE GLASS PLATES

Application filed July 7, 1928. Serial No. 290,948.

The invention relates to a method for removing defects of joinder from composite glass plates. Such a plate ordinarily comprises a pair of glass sheets cemented to the opposite sides of a thin sheet of pyroxylin plastic, such as, celluloids or pyralin. The cementing is usually done under heat and pressure in a rubber container or between diaphragms under similar conditions, the temperature ordinarily ranging about 250 degrees F., and the pressure about 150 pounds per square inch. It sometimes happens that at one or more points in the finished plate, a defect is found in the form of a hazy or gray spot, which unfits the plate for service. These defects are apparently due to imperfect joinder at the spots in question, and we have found that such defects may, in practically all cases, be removed by the use of the method and apparatus hereinafter described. The apparatus comprises what may be described as a pressure localizing button with a stiff back and a face of yielding material; such as, rubber thickened at the center. In use, this button is pasted on one of the glass sheets over the defect and the entire plate is then subjected to the original conditions of heat and pressure. The thick center of the button concentrates the pressure of the button on the small area of glass engaged by the thickened center of such button, and the glass is apparently sprung in at this point, so that the contact necessary between the glass and celluloid, in order to perfect the joinder at such defective point, is secured. The use of the button in connection with the rubber container process is illustrated in the accompanying drawings, wherein:

Figure 1 is a perspective view of the plate assembled in a rubber container ready for pressing with the correcting buttons applied thereto. Fig. 2 is a perspective view of the plate by itself with the buttons applied thereto. Fig. 3 is an enlarged section on the line III—III of Fig. 1. Figs. 4 and 5 are enlarged detail views of one of the buttons, Fig. 4 being a section on the line IV—IV of Fig. 5. And Fig. 6 is a sectional view through the pressure tank in which the container and its contents are placed for the pressing and heating operation.

Fig. 2 shows a plate of composite glass comprising the pair of glass sheets 1 and 2 with an interposed sheet 3 of pyralin cemented by the glass, the spots 4, 4, 4 indicating diagrammatically discolorations from poor joinder at these points. One of the buttons 5 shown in Figs. 4 and 5 is placed over each spot and secured in place by means of a strip of gummed paper 6, as indicated in Figs. 1 and 3. If desired, other buttons may be secured to the other side of the plate in opposition to the buttons shown, but this is not necessary in most cases.

The buttons may be variously constructed, the one shown, however, being cheap and effective. It consists of a disc of sheet copper about one-sixteenth of an inch thick to which is cemented a thin disc of rubber 8, such last disc having cemented on its face a smaller disc of rubber 9.

After the buttons are secured in place on the glass, the plate is inserted in the usual rubber container 10, together with the edge strips 11 for preventing too great an application of pressure to the edges of the plate. The container is next sealed by means of the clamp 12 and the air exhausted through the tube 13, after which the container is placed (along with others) in the pressure tank 14 (Fig. 6), being there supported by suitable racks. Water is now supplied to the tank and brought to a pressure of about 150 pounds per square inch, and a temperature of about 250 degrees F., the means for accomplishing this being well-known in the art. The temperature of the water is then reduced, the pressure being maintained during the cooling operation. When the plates are cool enough to be handled, the pressure is released and the containers removed from the tank. This completes the re-pressing operation, and, on removing the plates from the containers, it will be found that the defects or blemishes 4, 4, 4 have disappeared. This re-pressing operation can be carried on with other plates which are undergoing the same operation, or may be carried on in the tank in which other plates are being pressed and heated for the first time.

What we claim is:

1. A method of correcting a defect of joinder in a composite plate consisting of sheets of glass with interposed sheets of reinforcing material cemented thereto, which consists in applying a pressure localizing button of larger area than the defect to be corrected to the face of one of the glass sheets in opposition to such defect, and then exposing the plate to heat and pressure.

2. A method of correcting a defect of joinder in a composite plate consisting of sheets of glass with interposed sheets of reinforcing material cemented thereto, which consists in applying a pressure localizing button of larger area than the defect to be corrected to the face of one of the glass sheets in opposition to such defect, and then exposing the plate to heat and pressure conditions similar to those employed in originally joining the sheets together.

In testimony whereof, we have hereunto subscribed our names.

JAMES H. SHERTS.
WILLIAM O. LYTLE.